Nov. 24, 1970 W. C. SEPPELER 3,543,172

DIGITAL FREQUENCY DISCRIMINATOR

Filed Sept. 19, 1968

INVENTOR.
WAYNE C. SEPPELER

BY Lindenberg & Freilich

ATTORNEY

United States Patent Office 3,543,172

Patented Nov. 24, 1970

3,543,172
DIGITAL FREQUENCY DISCRIMINATOR

Wayne C. Seppeler, Sunnyvale, Calif., assignor to Anderson Jacobson, Inc., Mountain View, Calif., a corporation of California Filed Sept. 19, 1968, Ser. No. 760,755
Int. Cl. H04l 27/14
U.S. Cl. 329—104 17 Claims

ABSTRACT OF THE DISCLOSURE

A method and apparatus for digital frequency discrimination is provided by a binary counter and synchronized decoder employed to effectively measure the period of an FSK modulated signal, and to set or reset a flip-flop according to whether the period of the signal is of one or the other of the two frequencies. Clock pulses applied to the counter for the FSK signal period are derived from an oscillator that is synchronized by the leading edge of a cycle of the FSK signal to restart its oscillations with a full cycle.

BACKGROUND OF THE INVENTION

1.—Field of the invention

This invention relates to data terminals in digital communication systems using frequency modulation, and in particular a method and apparatus for frequency discrimination.

2.—Description of the prior art

In digital communication systems employing binary frequency modulation commonly called frequency-shift keying (FSK), two tones or frequencies represent the binary 1 (or mark) and the binary 0 (or space) signals used to compose the data transmitted. A receiver must then detect the two tones and provide a binary coded pulse train.

Heretofore, frequency detection has involved passing the input signal through a frequency selective network which provides an amplitude variation proportional to the instantaneous frequency. The output is then rectified and filtered. This method is straightforward, but not without problems. The use of a zero-crossing detector is usually simpler since it derives a binary coded pulse train directly from the time rate of zero-crossings. That is done by generating a pulse of fixed length and height at each zero-crossing of the received signal and integrating the pulse train in a low pass filter.

It would be desirable to employ digital techniques to detect the two frequencies and provide a binary coded pulse train in order to achieve all of the advantages inherent in digital techniques, such as precision in operation. The rapidly expanding technology of integrated circuits may give digital techniques a cost advantage as well as a size and weight advantage. The latter advantage is important in portable digital communication terminals.

OBJECTS AND SUMMARY OF THE INVENTION

A primary object of this invention is to provide a method and apparatus for digital frequency discrimination.

According to the invention, a binary counter and synchronized decoder are employed to effectively measure the period of a frequency modulated signal, and to set or reset a flip-flop according to whether the period of the signal is of one or the other of the two frequencies. A clock pulse generator designed to operate at a frequency higher than the two frequencies being discriminated is synchronized by the leading edge of a cycle of the received signal to restart oscillations with a full cycle. At substantially the same time, the number of clock pulses accumulated by the counter during a preceding period of the received signal is sampled by the decoder. Immediately thereafter, the counter is reset to zero in order that clock pulses generated during the extant period may be accumulated.

The clock pulse period may be set over a wide range of values provided the necessary parameters are satisfied. It is required that this clock period produce a different state for the binary counter for each frequency being detected. This detected state may or may not be unique depending upon the presence or absence of multiple and/or submultiple related frequencies. In a given system these other possible periods may not occur or may be removed by other filtering. The tolerance and stability of the periods to be detected and of the clock period are determining factors in the choice of the clock period. Also, the desired rejection of unwanted periods, and the number of stages desired in the implementation are relevant factors. The exact determination of the clock period is a compromise of the above-mentioned factors to result in an optimized solution for the particular application. As generally true with digital systems, the precision is determined by the number of stages and the clock precision.

In a common application where the two periods to be detected are not widely separated, and are long compared to the clock period, an appropriate choice for the clock period is approximately the difference in the two periods such that only one clock pulse separates the counts for the two frequencies. Ideally, the clock period is chosen so that a clock pulse occurs at the average of the two periods being detected. Thus, the counter changes state at the midpoint between the two periods to be detected, and the decoder samples a narrow range spanning each period to be detected.

A further refinement of the present invention for the same application is the choice for the clock period of approximately one-half the difference between the two periods to be detected. Thus, two clock pulses occur between the periods being detected and the periods will occur approximately halfway between clock pulses. The counter and decoder will then have an undetected state between two desired states to be detected. Thus, slight shifts in frequency due to noise that cause "jitter" in the zero-crossing will not readily be detected as the other period. Also, during frequency transitions "jitter" may cause the transition to be momentarily not a monotonic change. The undetected middlestate will significantly reduce the probability of detecting the improper state. Also, the precision in detecting only the two desired periods is improved by this refinement.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
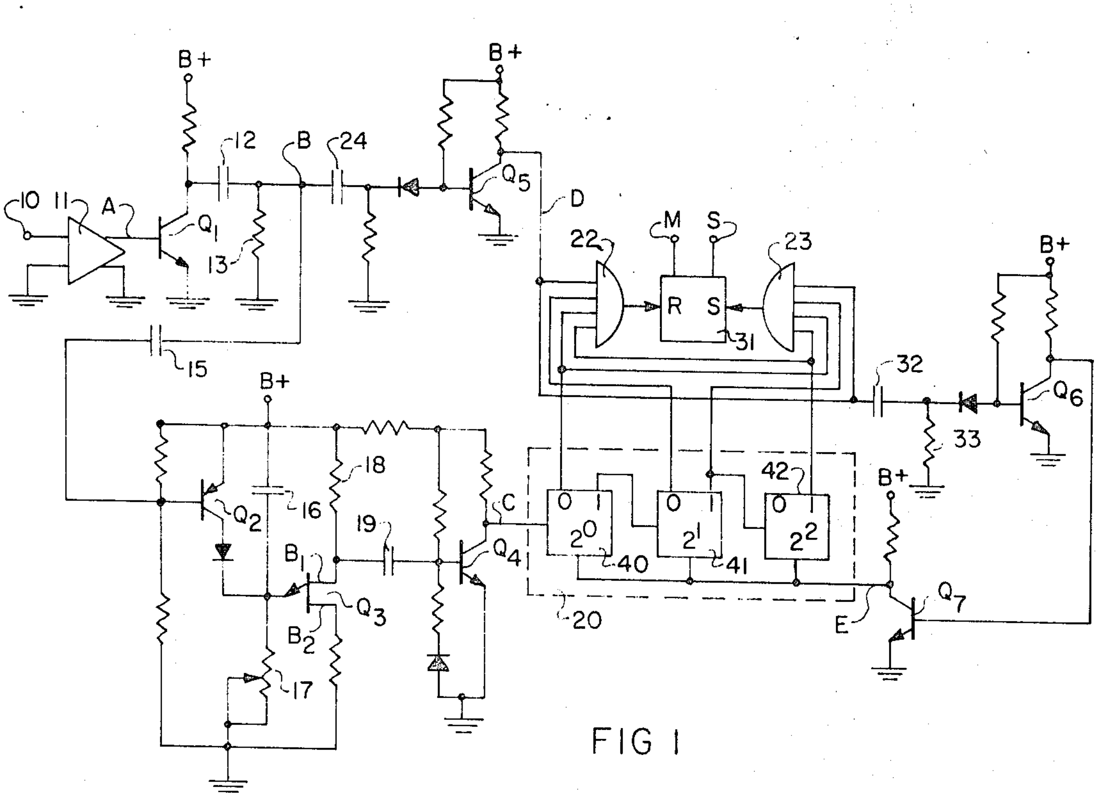
FIG. 1 illustrates a preferred embodiment of the present invention.
Figure 2:
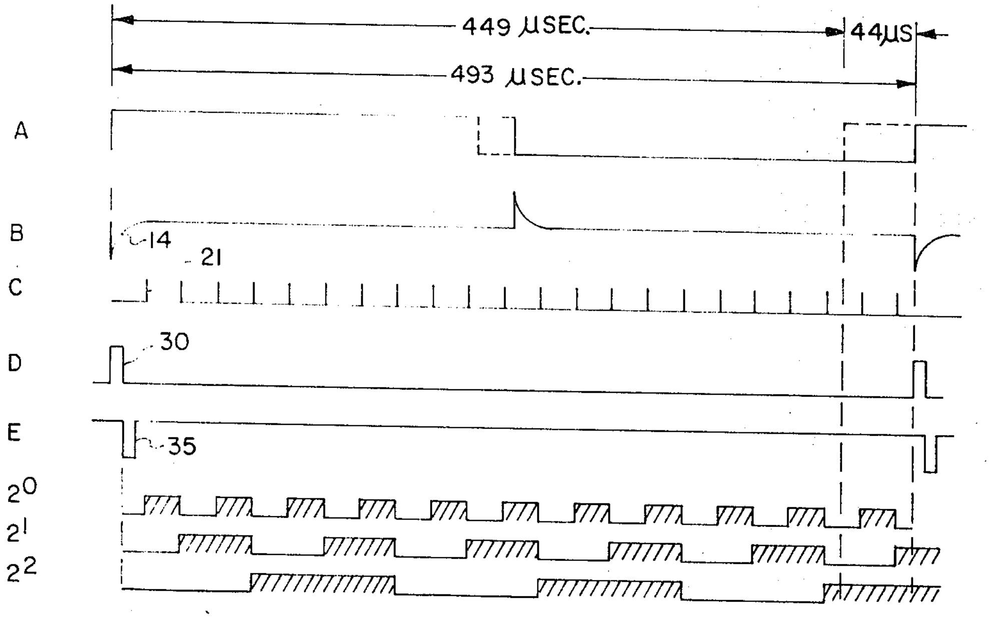
FIG. 2 is a timing diagram illustrating the operation of the preferred embodiment.

Referring now to FIG. 1, a frequency modulated signal is received at an input terminal 10 of an amplifier and limiter 11 which transforms the sine wave of the input signal to a rectangular wave as shown by waveform A in FIG. 2. In practice, the rectangular wave approaches a square wave. Accordingly, the waveform illustrated is solely for the purpose of establishing a time scale for one cycle to which other waveforms are related. Thus, the sequence of operation for one cycle begins with the positive going transition of the waveform A. An NPN transistor $Q_1$ inverts the waveform A to provide a negative going transition which is differentiated by a network comprising a capacitor 12 and a resistor 13 to provide a sharp negative pulse 14 illustrated in the waveform B of FIG. 2.

The negative pulse 14 is coupled by a capacitor 15 to the base of a PNP transistor $Q_2$ to momentarily switch it on. Conduction of the transistor $Q_2$ quickly discharges a capacitor 16 to restart the operation of a relaxation oscillator comprising the capacitor 16, a potentiometer 17 and a unijunction transistor $Q_3$ having an *n*-type emitter. The period of the oscillator is determined by the resistance of the potentiometer 17 in series with the capacitor 16. When the capacitor 16 is sufficiently charged, the unijunction transistor conducts to quickly discharge the capacitor 16 and start another cycle in a manner well known to those skilled in the art. The discharging current through a resistor 18 produces a negative pulse which is coupled by a capacitor 19 to the base of an NPN transistor $Q_4$ that inverts it to provide a positive pulse to a counter 20. Thus, the pulse 14 derived from the leading edge of the rectangular wave A restarts or recycles a relaxation oscillator in order that it may produce a train of clock pulses through the transistor $Q_4$ as shown in the waveform C of FIG. 2 starting with the full cycle.

Before the first pulse 21 of the waveform C is accumulated by the counter 20, the number of clock pulses accumulated during a preceding cycle of the input signal is sampled by a decoder comprising gates 22 and 23. That is accomplished by transmitting the pulse 14 to a transistor $Q_5$ via a capacitor 24. The transistor $Q_5$ responds to the negative pulse 14 to produce a positive pulse 30 shown in the waveform D of FIG. 2. If the number of clock pulses accumulated by the counter 20 during the preceding cycle of the input signal corresponds to a number representative of an input signal frequency of, for example 2225 Hz., gate 22 will conduct to reset a flip-flop 31 and provide at an output terminal M a positive output signal representing a binary 1 or mark signal. However, if that number of accumulated pulses is representative of a second frequency, for example 2025 Hz., gate 23 will conduct to set the flip-flop 31 and provide at an output terminal S a positive signal representative of a binary 1 or space signal. Thus, when the input signal shifts from one frequency to the other, the flip-flop 31 is switched from one state to the other to provide at the output terminal M a train of positive pulses, one for each binary 1 or mark signal transmitted. The output terminal S provides the binary complement of the digital signals transmitted. If, as will be described more fully hereinafter, the number of pulses accumulated does not correspond to either of the two frequencies, neither of the gates 22 and 23 will conduct and the flip-flop 31 will not be disturbed.

Once the number of pulses accumulated by the counter 20 has been sampled by the decoding gates 22 and 23 in response to the sampling pulse 30, an RC differentiating network comprising a capacitor 32 and a resistor 33 produces a negative pulse in response to the trailing edge of the sampling pulse 30. That negative pulse momentarily switches a transistor $Q_6$ off to provide a positive pulse at the base of a transistor $Q_7$ which inverts it and transmits to the counter 20 a negative pulse 35 as shown in the waveform E of FIG. 2 to reset each stage of the counter to zero.

The counter is comprised of three flip-flops 40, 41 and 42 connected in cascade for counting in a manner well known to those skilled in the art. Assuming the two frequencies are 2025 and 2225 Hz., the respective periods of one cycle are 493 and 449 microseconds as shown in the waveform A. The difference between the periods of the two frequencies is 44 microseconds. Accordingly, the clock pulse period of the relaxation oscillator may be set approximately equal to 44 microseconds by adjustment of the potentiometer 17. In that event, only the even numbered clock pulses illustrated in the waveform C would be produced and the counter 20 would be provided with decoding gates 22 and 23 to distinguish between the binary numbers 1010 indicative of the higher frequency 2225 Hz. and the binary number 1011 indicative of the lower frequency 2025 Hz. However, a slight variation in the frequency could cause an erroneous indication. For example, if the lower frequency 2025 were to increase slightly, the last clock pulse of the train illustrated in the waveform C would not be generated and accumulated since the beginning of the next cycle would cause the number of pulses then accumulated to be sampled and the counter to be reset as described hereinbefore. Accordingly, the period of the clock pulse generator is selected to be a fraction of the difference between the periods of the two frequencies being discriminated so that the difference in the number of pulses accumulated during a given cycle is more than one for the two frequencies. Then if the frequency of the signal shifts enough to cause one clock pulse more or less to be counted, the number of pulses actually accumulated may be ignored and the flip-flop 31 is allowed to remain in the same state until the frequency has shifted sufficiently to be an actual transition from a mark to a space, or from a space to a mark. In this preferred embodiment, the fraction selected is approximately a half but it should be understood that even smaller fractions may be employed such as one third.

By setting the period of the clock pulse generator slightly less than half the difference between the periods of the two frequeneies being discriminated, the number of pulses generated during one cycle of the lower frequency (2025 Hz.) is 22 while the number of pulses generated during one cycle of the higher frequency (2225 Hz.) is 20. Accordingly, the binary counter 20 and the decoding gates 22 and 23 should be set to decode the binary numbers 10100 and 10110, respectively. By comparing the two binary numbers to be decoded for distinguishing the two frequencies, it may be seen that only the three least significant binary digits are required since the binary number 100 will occur only in response to 4, 12 and 20 clock pulses while the binary number 110 will occur only in response to 6, 14 and 22 clock pulses. In other words, the decoded states are not unique, but the other than desired detected periods are grossly different, Prefiltering is assumed to precede this circuit and to eliminate these unwanted periods, or these other periods are absent. Additional counter stages may be added to reduce the assumption. Consequently, only a three-stage binary counter comprising flip-flops 40, 41 and 42 have been provided in this preferred embodiment. The gate 22 then detects the binary number 100 by having three of its input terminals connected to the three flip-flops as shown. The fourth input terminal is connected to the transistor $Q_5$ in order that the gate 22 reset the flip-flop 31 in response to a binary number 100 only after a given cycle of the input signal has been completed. Similarly, the gate 23 has three of its input terminals connected to the flip-flops 40, 41 and 42 as shown. The fourth input terminal is connected to the transistor $Q_5$ in order that the flip-flop 31 will not be set in response to a binary number 110 until after the cycle of the input signal have been completed. If neither binary number is present in the counter 20 at that time, neither one of the gates will conduct and the flip-flop 31 will remain in the same state as noted hereinbefore. In that manner, slight shifts in frequency will be ignored and the digital output of the flip-flop will not be changed.

Although a particular embodiment of the present invention has been described and illustrated, it is recognized that modifications and variations may readily occur to those skilled in the art, particularly in the pulse generating and shaping circuits shown. Consequently it is intended that the claims be interpreted to cover such modifications and all equivalents thereof.

I claim:

1. A digital system for discriminating between two frequencies of an input signal comprising:
 first means for generating clock pulses;
 second means adapted to receive said input signal for recycling said clock pulse generating means in synchronism with the start of each cycle of said input signal;
 third means connected to said first means for accumulating said clock pulses;
 fourth means for resetting said third means at the beginning of each cycle of said input signal;
 fifth means connected to said third means for detecting when a number of clock pulses accumulated by said fourth means during a given cycle of said input signal corresponds to a number representative of one of said two frequencies;
 sixth means connected to said third means for detecting when a number of clock pulses accumulated by said fourth means during said given cycle corresponds to a number representative of the other of said two frequencies; and
 a binary element having a set input terminal connected to said fifth means and a reset input terminal connected to said sixth means whereby said binary element is set and reset at the end of each cycle of said input signal in accordance with the two frequencies thereof.

2. A digital system as defined in claim 1 wherein said clock pulse period is chosen to provide at least one clock pulse between the periods of the two frequencies being discriminated.

3. A digital system as defined in claim 1 wherein said clock pulse period is chosen to provide at least two clock pulses between the periods of the two frequencies being discriminated.

4. A digital system as defined in claim 1 wherein said third means comprises a three-stage binary counter, said fifth means comprises a coincidence gate having a different input terminal connected to each one of said stages and a fourth terminal adapted to receive a sampling pulse in synchronism with the start of each cycle of said input signal, and said sixth means comprises a coincidence gate having a different input terminal connected to each of said counter stages and a fourth input terminal adapted to receive said sampling pulse.

5. A digital system as defined in claim 4 wherein said sampling pulse is derived from said second means.

6. A digital system as defined in claim 5 including means for resetting said counter immediately following said sampling pulse and before said clock pulse generator transmits a pulse after being recycled.

7. A digital system as defined in claim 6 wherein said clock pulse generator is a relaxation oscillator comprising an RC timing network and said second means comprises a switch responsive to the start of each cycle of said input signal for quickly discharging said capacitor to initiate a new RC timing period.

8. A digital system as defined in claim 7 wherein said clock pulse period is chosen to provide at least one clock pulse between the periods of the two frequencies being discriminated.

9. A method of discriminating a plurality of frequencies of an input signal comprising the steps of
 accumulating clock pulses generated by an oscillator during a given cycle of said input signal, said pulses being generated at a frequency greater than the expected frequencies of said input signal, the period between clock pulses being so chosen that at least one clock pulse occurs between the periods of the expected frequencies of said input signal;
 detecting the start of a new cycle of said input signal and in response thereto recycling said oscillator, determining the number of clock pulses accumulated, and starting a new acumulation of clock pulses; and
 during each cycle of the input signal, generating an output signal representing the number of pulses accumulated during the previous input signal cycle as determined by the preceding step.

10. A method as defined in claim 9 wherein said plurality of frequencies is two in number and said output signal is a binary signal having one value representing one input signal frequency, and another value representing another input signal.

11. A method as defined in claim 10 wherein said period between clock pulses is chosen such that only one clock pulse more is accumulated during one cycle of the input signal at one frequency than at another frequency.

12. A method as defined in claim 11 wherein said period between clock pulses is chosen such that a plurality of more clock pulses are accumulated during one cycle of the input signal at one frequency than at another frequency.

13. A method as defined in claim 12 wherein said plurality of more clock pulses are two in number.

14. A method as defined in claim 13 wherein the accumulation of clock pulses is by a recycling binary counter having less stages than necessary for accumulating all of the clock pulses which are generated during the shortest period expected of the input signal.

15. A method as defined in claim 14 wherein said period between clock pulses is chosen such that only one clock pulse more is accumulated during one cycle of the input signal at one frequency than at another frequency.

16. A method as defined in claim 15 wherein said period between clock pulses is chosen such that a plurality of more clock pulses are accumulated during one cycle of the input signal at one frequency than at another frequency.

17. A method as defined in claim 16 wherein said plurality of more clock pulses are two in number.

References Cited

UNITED STATES PATENTS

| | | | |
|---|---|---|---|
| 3,092,736 | 6/1963 | Ernyei | 329—104 X |
| 3,230,457 | 1/1966 | Soffel | 329—110 X |

ALFRED L. BRODY, Primary Examiner

U.S. Cl. X.R.

178—66; 307—233; 325—320; 328—140